US008880651B2

(12) United States Patent
Nielsen

(10) Patent No.: US 8,880,651 B2
(45) Date of Patent: Nov. 4, 2014

(54) METHOD AND SYSTEM FOR EFFICIENT DOWNLOAD OF DATA PACKAGE

(75) Inventor: Sven E. Nielsen, San Diego, CA (US)

(73) Assignee: Sony Computer Entertainment America, LLC, San Mateo, CA (US)

(*) Notice: Subject to any disclaimer, the term of this patent is extended or adjusted under 35 U.S.C. 154(b) by 478 days.

(21) Appl. No.: 13/190,360

(22) Filed: Jul. 25, 2011

(65) Prior Publication Data

US 2013/0031214 A1    Jan. 31, 2013

(51) Int. Cl.
*G06F 15/16* (2006.01)
*G06F 9/445* (2006.01)

(52) U.S. Cl.
CPC ........................................ *G06F 8/65* (2013.01)
USPC ............................ 709/219; 709/203; 709/205

(58) Field of Classification Search
USPC .......... 709/219, 203–205, 217–218, 220, 221
See application file for complete search history.

(56) References Cited

U.S. PATENT DOCUMENTS

| | | | | |
|---|---|---|---|---|
| 5,781,785 | A | * | 7/1998 | Rowe et al. .................... 715/234 |
| 6,073,214 | A | * | 6/2000 | Fawcett ........................ 711/133 |
| 6,167,567 | A | * | 12/2000 | Chiles et al. .................. 717/173 |
| 6,199,107 | B1 | * | 3/2001 | Dujari ............................ 709/219 |
| 6,434,569 | B1 | | 8/2002 | Toshimitsu et al. | 
| 6,493,871 | B1 | * | 12/2002 | McGuire et al. ............... 717/173 |
| 6,671,772 | B1 | | 12/2003 | Cousins |
| 6,711,557 | B1 | * | 3/2004 | Palaniappan ................... 706/45 |
| 7,260,703 | B1 | | 8/2007 | Moore et al. |
| 7,590,522 | B2 | | 9/2009 | Hansen et al. |
| 8,145,989 | B2 | * | 3/2012 | Kim et al. ..................... 715/200 |
| 8,239,852 | B2 | | 8/2012 | Etchegoyen |
| 2003/0093640 | A1 | | 5/2003 | Mowery et al. |
| 2003/0188092 | A1 | | 10/2003 | Heath et al. |
| 2003/0229755 | A1 | | 12/2003 | Espeseth et al. |
| 2006/0161694 | A1 | | 7/2006 | Tomozaki et al. |
| 2009/0193188 | A1 | | 7/2009 | Levine |

FOREIGN PATENT DOCUMENTS

| | | |
|---|---|---|
| KR | 20080037450 A | 4/2008 |
| KR | 20100088990 A | 8/2010 |

OTHER PUBLICATIONS

Cell Broadband Engine Architecture, copyright International Business Machines Corporation, Sony Computer Entertainment Incorporated, Toshiba Corporation Aug. 8, 2005 which may be downloaded at http://cell.scei.co.jpl.

PCT International Search Report dated Sep. 3, 2009 for International Application No. PCT/US2009/043387.

(Continued)

*Primary Examiner* — Ruolei Zong
(74) *Attorney, Agent, or Firm* — Joshua D. Isenberg; JDI Patent

(57) ABSTRACT

Methods for efficient download of a data package and a client device and server that may implement such methods are disclosed. The client device sends an inventory identifying existing stored content packages to the download server. The download server identifies portions of the requested data package already corresponding to content elements already stored on the client device, and sends information to the client device indicating which portions of the requested data package are already stored on the client device. The client device gathers the already-stored portions of the requested data package and requests a remaining portion of the requested data package from the download server. The download server receives the request for the remaining portion of the requested data package and sends the remaining portion to the client device.

23 Claims, 4 Drawing Sheets

(56) References Cited

OTHER PUBLICATIONS

Gwosdek, "Realtime Optical Flow Algorithms on the Cell Processor", Department of Computer Science, Saarland University, Apr. 14, 2008, entire document.

U.S. Appl. No. 12/130,892, filed May 30, 2008.
U.S. Appl. No. 12/902,768, filed Oct. 12, 2010.
Final Office Action for U.S. Appl. No. 12/130,892 dated Sep. 22, 2011.
Korean Office Action for KR Application No. 10-2012-0080983, dated Dec. 30, 2013.

* cited by examiner

METHOD AND SYSTEM FOR EFFICIENT DOWNLOAD OF DATA PACKAGE

FIELD OF INVENTION

Embodiments of the present invention are related computer networks and more specifically to download of data packages from a network.

BACKGROUND OF INVENTION

Currently, many computer game networks and smart phone networks operate as closed platform networks. As used herein, a closed platform network refers to a network that inhibits external modification of network applications, programs, and other restricted content associated with a specific client device or platform that uses the network. Client devices that operate on such networks are sometimes referred to herein as closed platform devices. By way of contrast, in an open platform network or open platform device such modification is not inhibited.

By way of example, and not by way of limitation, certain computer game networks associated with video game consoles are configured to operate as closed platform networks. In a closed platform computer game network, restricted code and restricted data associated with gaming titles, applications, media and other forms of restricted content associated with the gaming consoles or portable gaming devices that use the network are protected from user or third party modification. In other words, once a restricted application, restricted program, or other piece of restricted content has been loaded (e.g., by disc, by download, etc.) onto a computer game system operating within the closed universe, that data remains in its original form until the operators of the network decide to modify it (e.g., by update patch, etc.). No user of the computer game platform or third party is allowed to access and modify that restricted data except through authorized channels. In such a closed platform network, management of system applications, programs, and data is greatly simplified because data is shielded from unknown/unwanted modification. As such, a closed-platform network may remain aware of the state of each application, program, and piece of data running within its boundaries at all times.

Closed platform gaming networks are also configured to transmit data via download from a network server to a client game system in the form of applications, programs and other pieces of data. Such data may range anywhere from 10 MB per transmission to 2 GB per transmission depending on the application. Larger transmissions can take several hours and sometimes even days to complete.

It is within this context that embodiments of the present invention arise.

DESCRIPTION OF THE SPECIFIC EMBODIMENTS

Figure 1:
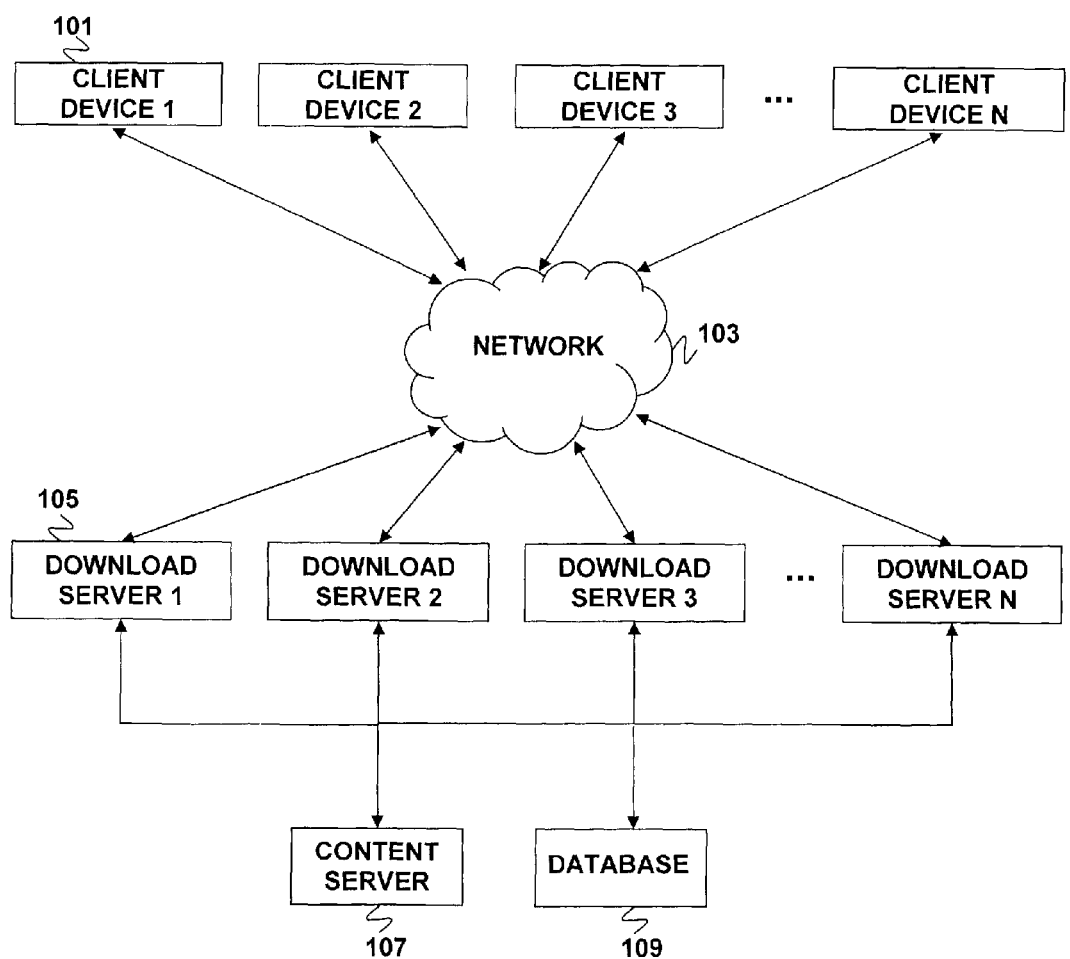
FIG. 1 is a schematic: diagram illustrating a closed-universe system according to an embodiment of the present invention.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Embodiments of the invention arise from recognition of the fact that large transmissions may include several data redundancies that hinder the efficiency of the transmission process. By way of example, and not by way of limitation, a user of a computer game system may wish to download the newest sequel (e.g., SOCOM 4) of a gaming title that he already owns the previous version (e.g., SOCOM 3) of. Currently, these gaming networks are configured to transmit entire data packages for download without accounting for redundancies in the code and data between the two versions. Stated differently, the data package being transmitted for the newest sequel includes all video assets, audio assets, game engines, library content, etc. associated with the newest sequel even if several portions of the data package may have been previously loaded onto the game system from the previous version.

Some companies, such as NetApp, EMC, and others, have systems that perform 'deduplication', which is sometimes used as a form of compression. Deduplication systems scan files for duplicated sections, removes all but one of the duplicated sections, and establishes pointers to the one remaining section so that the file may be stored on disk in a smaller form without repeating information. Checksums are used in some deduplication implementations, in order to find candidate files across a file system that may contain identical segments that can have deduplication processing applied to them.

Some systems exist for transferring specific sections of a file and using checksums to find already-existing sections. For example some modern day web browsers, the BitTorrent file transfer method, and the 'rsync' software, among others, use the concept of requesting segments of files to be transferred to fill out a partial file. BitTorrent and rsync, specifically, also use the concept of checksumming portions of an existing file to determine whether or not specific sections need to be transferred or downloaded again, and to build a list of any missing segments of a file for transfer over a network. It is noted however that the concept of using checksums to test for the existence and validity of a portion of a file is only used with BitTorrent and rsync to compare two specific files that should be identical at the end of a successful transfer or download.

Because closed-platform networks have the ability to easily monitor states of all applications, programs, and other pieces of data loaded within, they may be able to employ more efficient mechanisms for transmission of data packages via download.

Embodiments of the invention allow a client device operating within a closed-platform network to send a request for a restricted data package along with an inventory identifying stored content (e.g., a list identifying packages of stored content rather than copies of the actual content or list of elements that make up the packages) to a server operating within the same closed-platform by way of a network. The server may use the information to determine which portions of the requested data package are already stored on the client device and provide instructions to the client device directing it to assemble the portions of the data package already existing on the client device. The server may then send remaining portions of the data package to the device upon request.

As seen in FIG. 1, an efficient closed-platform system 100 may include one or more client devices 101 and one or more download servers 105. The client devices 101 and download servers 105 may be configured to communicate with each other over a closed-platform network 103. By way of example, and without loss of generality, the network 103 may be a bi-directional digital communication network. The network 103 may be a local area network or wide area network. The network 103 may be implemented, e.g., using an infrastructure, such as that used for CATV bi-directional networks, ISDN or xDSL high speed networks to enable network connections for implementing certain embodiments of the present invention.

By way of example, and without limitation, the client devices 101 may be video game consoles. Examples of commercially available game consoles include the Xbox® from Microsoft Corporation of Redmond Wash., the Wii® from Nintendo Company, Ltd of Kyoto Japan and PlayStation® devices, such as the PlayStation 3 from Sony Computer Entertainment of Tokyo, Japan. Xbox® is a registered trademark of Microsoft Corporation of Redmond, Wash. PlayStation® is a registered trademark of Kabushiki Kaisha. Sony Computer Entertainment of Tokyo, Japan. Wii® is a registered trademark of Nintendo Company, Ltd of Kyoto, Japan. Alternatively, the client devices 101 may be any other type of closed-universe network capable device. By way of example, and not by way of limitation, such a closed-universe network capable device may include smartphones (e.g., iPhone, Android Phone, etc.)

As used herein, the term "closed-platform" refers to a network wherein certain content packages associated with the network are shielded from external modification. Such content packages may include applications, programs, audio/video media, and other types of data associated with the network. Certain elements of restricted content packages transmitted between client devices 101 and download server 105 may only be modified upon network authorization. For convenience, such elements are referred to herein as restricted content elements. Restricted content elements on the client device 101 may not be altered by the client or any other $3^{rd}$ party unless authorized. Thus, for a closed-platform device or closed-platform application, management of updates may be greatly simplified.

As used herein, the term "data package" refers to a collection of data that make up portions of a content package to be transmitted between a download server 105 and a client device 101. By way of example, and not by way of limitation, such data packages may include applications, programs, video/audio media, update patches, or any other collection of data to be transmitted from the download server to the client device.

The client devices 101 may receive instructions and portions of data packages from one or more download servers 105. A download server 105 may determine which portions of a requested data package may be located on a client device 109 by using a database 109 connected to the download server 105. By way of example, and not by way of limitation, such a database 109 may include information pertaining to a client device's stored restricted content as well as information pertaining to the requested data package. By way of example, and not by way of limitation, the download server 105 may also retrieve requested remaining portions of a data package from a content server 107 for transmission to the client device 101. Alternatively, the download server 105 could store data packages and portions thereof internally.

Figure 2:
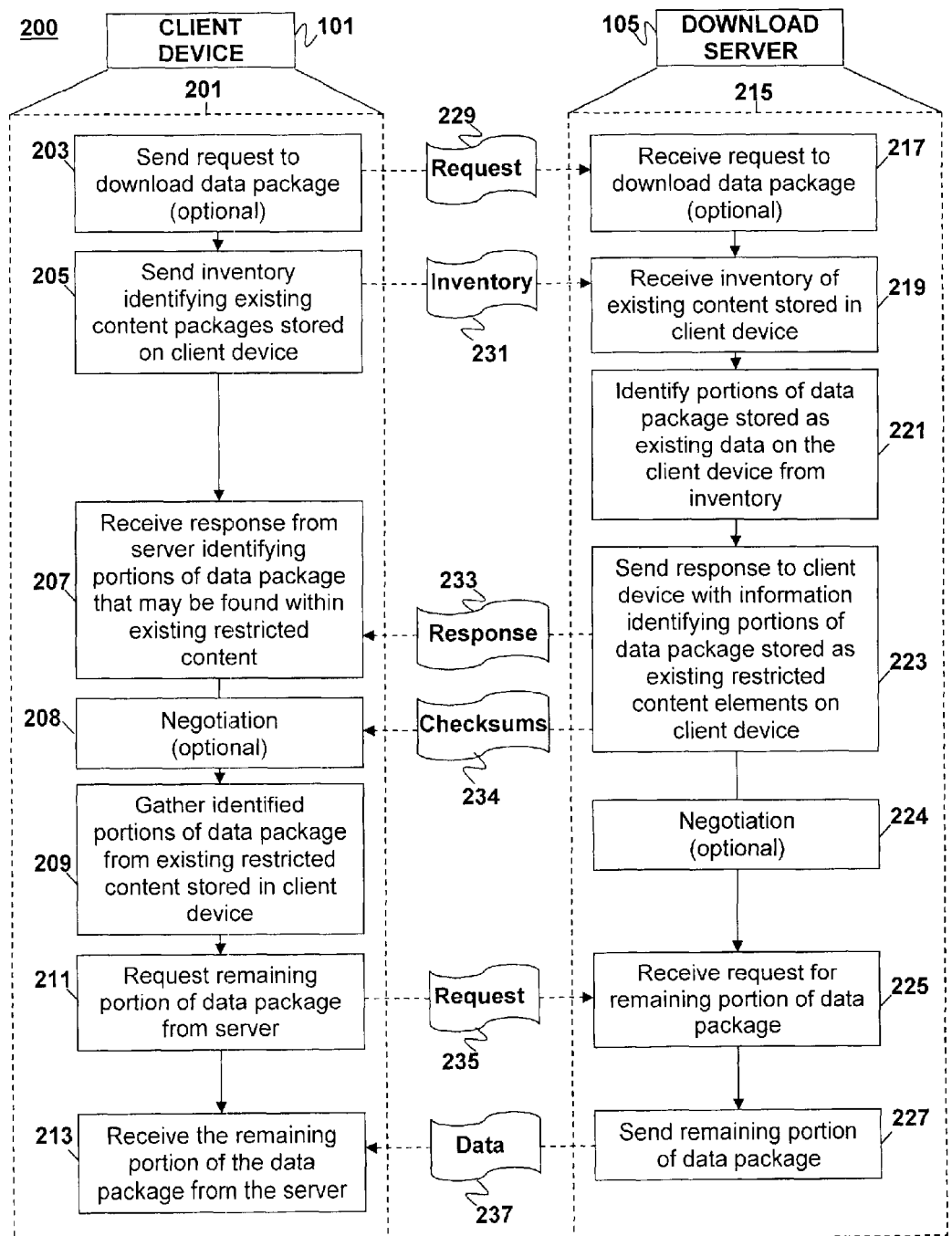
FIG. 2 is a flow diagram illustrating an efficient method for download of a data package according to an embodiment of the present invention.

As shown in FIG. 2, the closed-universe system 100 may be configured to implement a method for efficient download of data packages for restricted content according to an inventive method 200. Various aspects of the method 200 may be implemented by execution of computer executable instructions running on the client device 101 and/or download servers 105. Specifically, a client device 101 may be configured, e.g., by suitable programming, to implement certain client device instructions 201. In addition, a download server 105 may be configured to implement certain download server instructions 215.

Initially, a client device 101 may optionally send a request 229 to the download server 105 to download a data package as indicated at 203. By way of example, and not by way of limitation, such a request 229 may be made by the user of the client device 101. For example, the user of a game console may request to download a restricted content package, such as a demo or full-version of a gaming title, onto his device 101. Alternatively, the request 229 may be made automatically by the client device 101. For example, a client device 101 may prompt the download server 105 for device updates or restricted content updates for content packages periodically at predetermined times. The download server 105 optionally receives the request 229 as indicated at 217. After receiving the request 229, the download server 105 may store the request 229 in its local memory for subsequent processing.

The client device 101 sends an inventory 231 of stored existing content to the download server 105. The inventory 231 may provide a list of all restricted content packages stored on the client device 101. The list identifies the restricted content packages stored on the device, but does not include the actual content or a list of elements (e.g., code and/or data files) that make up the content packages. The client device 101 may send the inventory as part of a download request 231 or may send the inventory in response to a notification from the server 105 that a download is available.

As used herein, the term content package refers to a set of computer readable elements, e.g., files that are associated with a common function. As used herein, the term content element refers to a computer readable element, e.g., a file that is a component of a content package such as an application or media package. By way of example, and not by way of limitation, a content package may include all code and/or data files associated with a given software application or game title.

By way of example, and not by way of limitation, if the restricted content stored on the device is in the form of different applications, the list may identify each application by an application identifier (e.g., a title) and a corresponding version identifier (e.g., a version or build number for the corresponding application). By way of example, and not by way of limitation, a gaming console with a plurality of stored games may send an inventory to the download server 105 which identifies each game title and corresponding version stored on the device. It is noted that for each game title there may be a set of corresponding elements (e.g., code or data), which may be stored as a set of files. The code and/or data may change with each different version number. However, if the device operates on a closed platform network, the corresponding code and/or data files can be readily identified from the game title and version identifier. Furthermore, the location of these files or specific content elements inside a restricted content package on a closed-platform client device may be determined or determinable from knowledge of the title and version number. In other cases, knowledge of the title and version number can be used to determine a list of identifiers (e.g., filenames) corresponding to elements that make up the content package that is stored on the client device.

By limiting the inventory 231 to a list of content package identifiers, rather than a list of all content files, significant bandwidth may be saved in sending the list and the complexity of preparing the list may be greatly reduced.

The download server 105 receives this inventory 231 as indicated at 219. After receiving the inventory 231, the download server 105 may store it in its local memory for subsequent processing. After receiving both the data package request 229 and client inventory 231, the download server 105 may identify portions of the data package that are already stored on the client device from the inventory as indicated at 221. In particular, the server 105 may compare a set of content elements in the data package to a set of existing content elements determined from the inventory 231. By way of example, and not by way of limitation, already-stored portions may be identified with the aid of a lookup table or database. Because the client device 101 and download server 105 operate in a closed-platform network, any content stored on any client device within the closed-platform network must be an original version or authorized updated version (i.e., no unauthorized versions exist). Thus, the download server 105 may simply keep a database/lookup table for all content elements corresponding to each restricted content package released within the network. The download server 105 may determine which portions of the data package request 229 are already stored in one form or another on the client device by comparing a list of content files for the data package request 229 to the database/lookup table for each piece of content listed in the inventory 231.

By way of example, and not by way of limitation, in the context of computer games, many game titles share various portions of data (e.g., video assets, audio assets, game engines, library content, etc.). This is especially true where game titles are sequential in nature. As such, identifying which portions of a data package request 229 are already stored on a client device may facilitate more efficient creation of that data package and reduce the total amount of data being transmitted across the network.

After identifying portions of the requested data package already existing on the client device, the download server 105 may then send a response 233 to the client device containing information identifying those portions already stored on the device as indicated at 223. In some cases the response may optionally indicate a location within the client device for accessing each portion. In some cases, the information in the response may include a list of content identifiers (e.g., filenames) for content elements in the download package that are already stored on the client device. The client device 101 receives the information identifying those portions already stored on the device and locations for accessing each portion as indicated at 207. After receiving the response 233, the client device 101 may store the response in its memory for subsequent processing.

The embodiment described with respect to FIG. 2 may be extended with extra optional scanning and verification of files or data portions to ensure that the client device 101 contains the same files that the server 105 expects. For example, in addition to the response 233 containing the list of files (or data portions), the server 105 can also send checksums 234, if needed, that the client 101 can use to verify that the files (or data portions) in the response 233 correspond to the ones that the server thinks are correct. An additional negation loop 208, 224 to eliminate files or data portions that don't match those in the response 233 or to find suitable substitutes (e.g., second-choice files that can be substituted for files in the response 233) can be implemented to "negotiate" the pieces of the download package that the client can then copy locally. Such features are useful, e.g., if the client device 101 is part of an open-platform system.

The client device 101 may then gather the identified portions of the data package from the existing content located on the client device using the instructions 233 as indicated at 209. By way of example, and not by way of limitation, the information in the response 233 may optionally include code instructions to be executed by a processor associated with the client device 101 that are configured to guide the client device 101 in collecting the portions of the data package already existing on the device. Alternatively, the client device 101 may be configured to locate and gather portions of the data package already existing on the device without additional code. By way of example, and not by way of limitation, the information in the response 233 may include a list of filenames corresponding to restricted content files that in turn correspond to a content package and version number on the inventory sent to the server. In such a case, the client device 101 may search its local storage device (e.g., hard drive) for the files corresponding to the filenames listed in the response. The gathered files may include substitutes for non-matching files that are identified during an optional verification and negotiation at 208.

By way of example, and not by way of limitation, gathering identified portions of the data package may involve copying portions of existing stored content that correspond to identified portions of the data package. Alternatively, the client device may create a pointer to the existing stored content that corresponds to the identified portions of the data package. Rather than copying portions of stored content, the data package may simply locate the stored content and access it when needed using the pointer.

Once identified portions of the data package have been gathered by the client device 101, the client device 101 may request a remaining portion of the data package from the server 105 as indicated at 211. By way of example, and not by way of limitation, the request 235 may simply be a notification to the server 105 indicating that the client device 101 has completed gathering of identified portions of the data package. Alternatively, the client device 101 may be configured to run a scan of the partially completed data package to determine the remaining portions needed. In such an implementation, the client device 101 may independently verify whether all portions of the data package identified by the download server are indeed already present on the client device. The download server 105 receives this request as indicated at 225.

After receiving the request 235 for a remaining portion of the data package from the client device 101, the download server 105 sends the remaining portion 237 of the data package to the client device 101 as indicated at 227. By way of example, and not by way of limitation, the download server 105 may retrieve requested remaining portions of a data package from a content server for transmission to the client device 101. Alternatively, the download server 105 could store such requested remaining portions of the data package within its local storage for subsequent retrieval and transmission. The client device 101 then receives the remaining portion of the data package 237 as indicated at 213. The client device 101 may then store the complete data package within its local memory or storage for subsequent use.

By way of example, and not by way of limitation, the client device 101 may be configured to perform a scan of the data package after receiving the remaining portion of the data package from the download server 105. This additional scan provides additional assurance that all portions of the data package have been correctly gathered, and that no pieces are missing.

Figure 3:
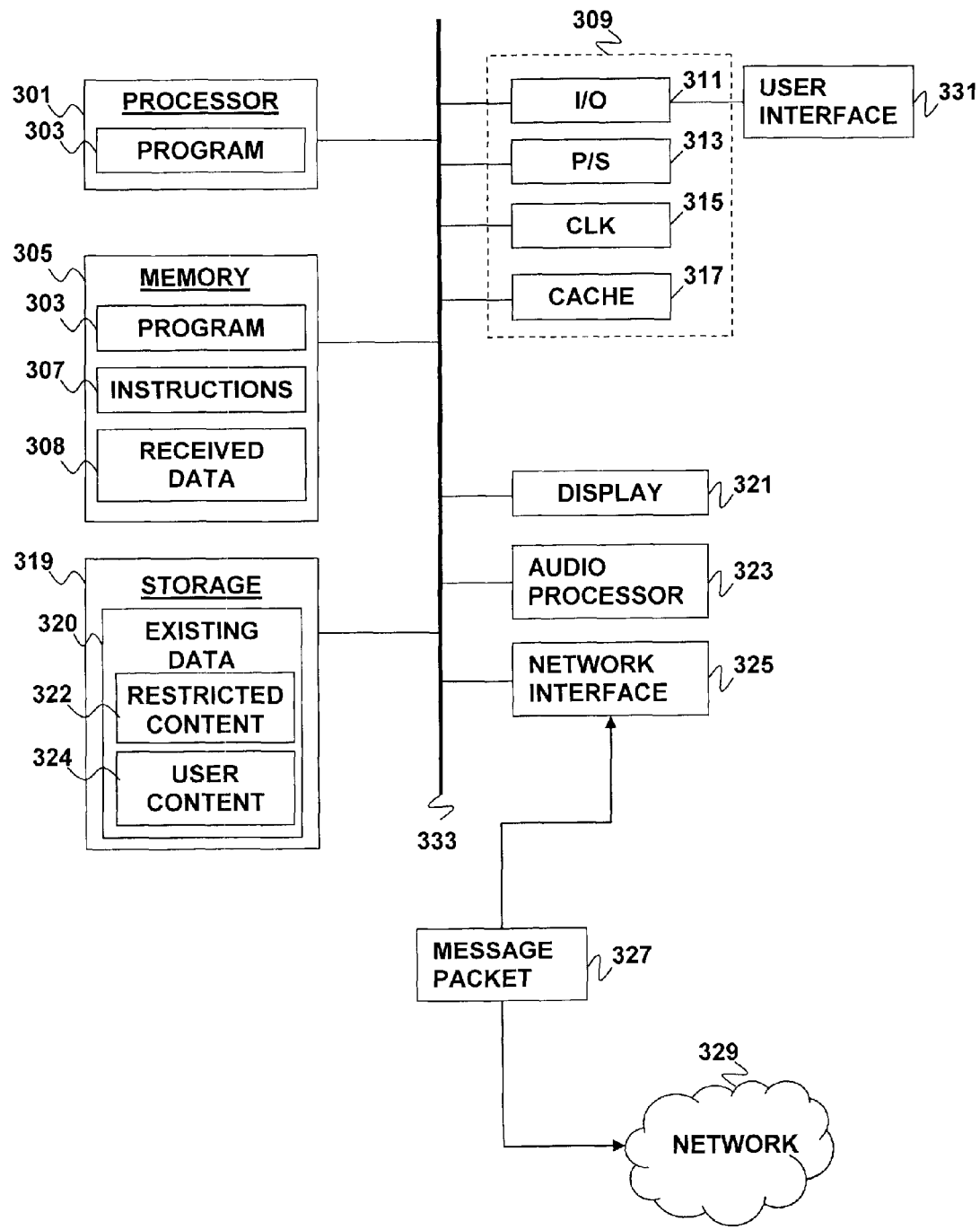
FIG. 3 is a block diagram illustrating a client device according to an embodiment of the present invention.

By way of example, the client device 101 may be configured as shown in FIG. 3, which depicts a block diagram illustrating the components of a client device 300 according to an embodiment of the present invention. By way of example, and without loss of generality, the client device 300 may be implemented as a computer system, such as a video game console, smart phone, or other digital device suitable for practicing an embodiment of the invention. The client device 300 may include a processor module 301 configured to run software applications and optionally an operating system. The processor module 301 may include one or more processor cores.

The client device 300 may also include a memory 305 configured to store applications and data for use by the processor 301. The memory 305 may be in the form of an integrated circuit, e.g., RAM, DRAM, ROM, and the like. The memory 305 may also be a main memory that is accessible by all of the processor modules. In some embodiments, the processor module 301 may have local memories associated with each core. A program 303 may be stored in the main memory 305 in the form of processor readable instructions that can be executed by the processor modules. The program 303 may be configured to implement a method for efficient download of data packages. By way of example, the program 303 may include instructions to send a request to a download server to download a data package, send an inventory identifying existing restricted content packages stored in the client to the download server, receive information from the download server identifying portions of the data package already stored on the client device and (optionally) their respective locations within the client device, gather identified portions of the data package from existing content stored on the client device, request a remaining portion of the data package from the download server, and to receive the remaining portion of the data package from the download server. The program 303 may be written in any suitable processor readable language, e.g., C, C++, JAVA, Assembly, MATLAB, FORTRAN, and a number of other languages.

Download package information 307 received by the client device 300 from the download server may also be stored in the memory 305. Such information 307 may identify portions of the data package that may be found within existing content located on the client device and may also identify their respective locations. The information 307 may optionally include executable code instructions that are configured to guide the client device 300 in gathering portions of the data package already existing on the device. Download package data 308 received by the client device 300 may also be stored in the memory 305. Such received data 308 may include remaining portions of a data package received from the download server that did not previously exist on the client device. During execution of the program 303, portions of program code, download information 307, and/or data 308 may be loaded into the memory or the local stores of processor cores for parallel processing by multiple processor cores.

The client device 300 may also include well-known support functions 309, such as input/output (I/O) elements 311, power supplies (P/S) 313, a clock (CLK) 315, and a cache 317. The device 300 may optionally include a mass storage device 319 such as a fixed disk drive, removable disk drive, flash memory device, tape drive, CD-ROM, DVD-ROM, Blu-Ray, HD-DVD, UMD, or other optical storage devices. The storage device 319 may be used for temporary or long-term storage of content 320 (e.g., applications, programs, audio/video, etc.). It is noted that content 320 may include restricted content packages 322 and user content 324. As discussed above, the restricted content packages 322 are protected against modification by a user of the device 300 or a third party. The restricted content packages 322 may include restricted code and restricted data associated e.g., with application titles, game titles, media content, and other forms of restricted content associated with the device 300 or other similarly configured closed-platform devices that use a closed platform-network. The location of restricted content elements that make up the restricted content packages 322 may be determined in a uniform manner for closed platform devices. By this it is meant that the identity and/or location of each file that makes up an item of content within the storage device 319, e.g., the volume, sector, or address may be predetermined or determinable from the fact that the content package is present on the storage device.

The content 320 may also include user content 324 that is not protected against modification. In other words, the user or a third party may create such user content and/or modify it. Examples of user content 324 include, but are not limited to user profiles, game saves, user generated messages such as chat or emails, user preferences, device settings, and the like.

The device 300 may optionally include a display unit 321 and user interface unit 331 to facilitate interaction with the device 300. The display unit 321 may be any device capable of displaying visual information in response to a signal from the client device 300, including CRT, LCD, plasma, and OLED displays. The client device 300 may provide the display unit 321 with an analog or digital signal. By way of example, the display unit 321 may include a cathode ray tube (CRT) or flat panel screen that displays text, numerals, graphical symbols, or images. In addition, the display 321 may include one or more audio speakers that produce audible or otherwise detectable sounds. To facilitate generation of such sounds, the client device 300 may further include an audio processor 323 adapted to generate analog or digital audio output from instructions and/or data provided by the processor 301, memory 305, and/or storage 319. The user interface 331 may include a keyboard, mouse, joystick, light pen, or other device that may be used in conjunction with a graphic user interface (GUI).

The device 300 may also include a network interface 325 to facilitate communication via an electronic communications network 329. The network interface 325 may be configured to implement wired or wireless communication over local area networks and wide area networks such as the Internet. The client device 300 may send and receive data and/or requests for data packages via one or more message packets 327 over the network 329.

The components of the client device 300 including the processor 301, memory 305, support functions 309, data storage 319, user interface 331, display 321, audio processor 323, and network interface 325 may be operably connected to each other via one or more data buses 333. These components may be implemented in hardware, software, or firmware or some combination of two or more of these.

Figure 4:
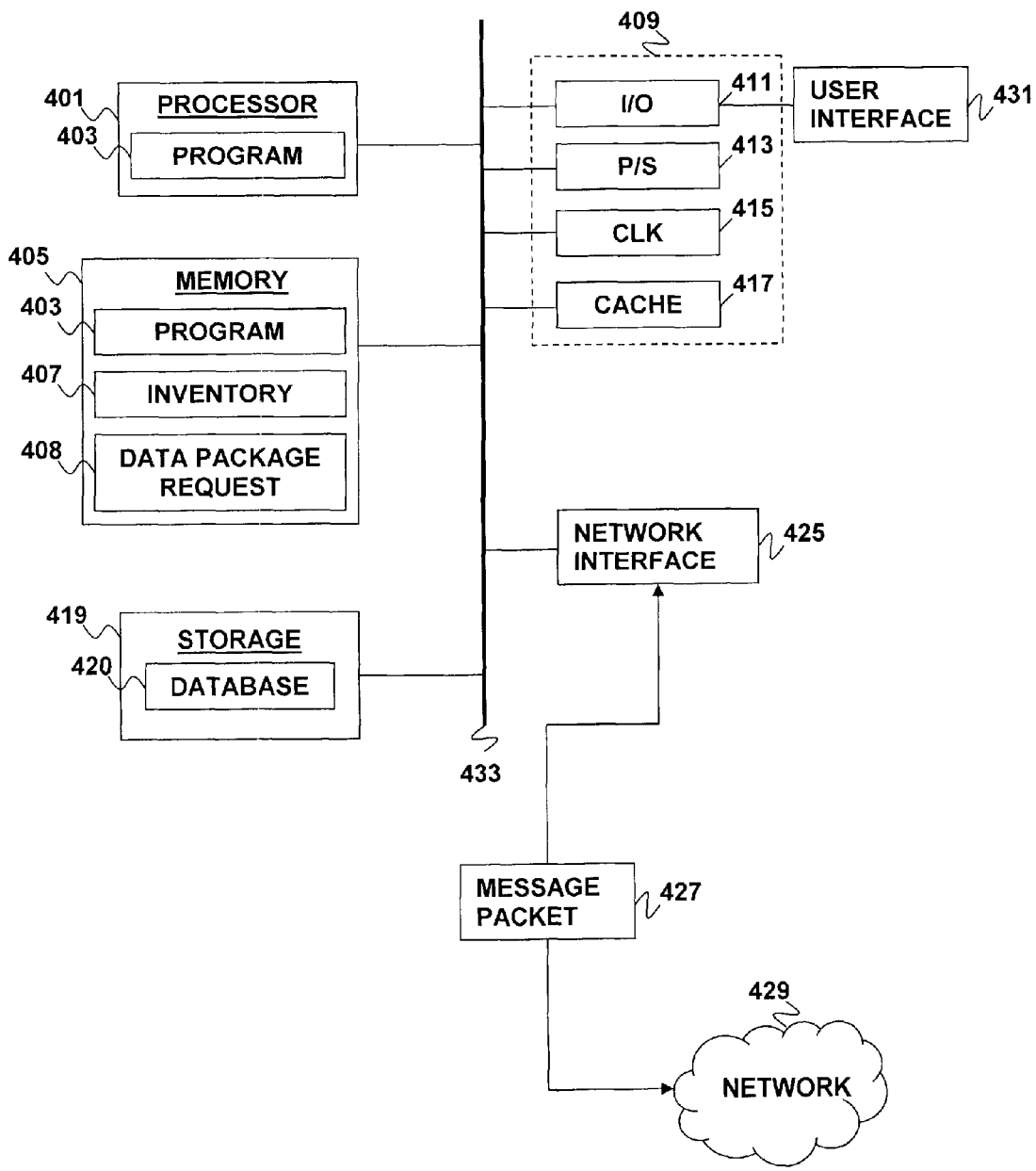
FIG. 4 is a block diagram illustrating a download server according to an embodiment of the present invention.

By way of example, and without loss of generality, the download servers 105 in the system 100 may be configured as shown in FIG. 4. According to an embodiment of the present invention, a download server 400 may be implemented as a computer system or other digital device. The download server may include a processor 401 configured to run software applications and optionally an operating system. The processor 401 may include one or more processing cores. By way of example and without limitation, the processor 401 may be a parallel processor module, such as a Cell Processor.

The download server 400 may also include a memory 405 configured to store applications and data for use by the processor 401. A computer program 403 may be stored in the memory 405 in the form of instructions that can be executed by the processor 401. The instructions of the program 403 may be configured to implement, amongst other things, a method for efficient download of data packages e.g., as described above with respect to the download server operations 215 in FIG. 2. Specifically, the download server 400 may be configured, e.g., through appropriate programming of the program 403, to receive a request from a client device to download data packages, receive inventory of existing content packages stored in the client device, identify portions of the data package that are stored as existing content elements on the client device, send instructions to the client device identifying existing content elements corresponding to portions of data package, receive a request for a remaining portion of the data package, and to send the remaining portion of the data package to the client device.

An inventory 407 of the existing content stored on the client device may also be stored in the memory 405. Such an inventory 407 may include a list of all content packages stored on the client device. The list may identify the content package (e.g., by title or other identifier), but need not include a list of the content elements that make up the package or the actual content itself. By way of example, and not by way of limitation, a gaming console (i.e., client device) with a plurality of stored games may send an inventory to the download server which lists each game title and the particular version stored on the device. If the client device is a closed-platform device, the content elements that make up each content package can be determined from a content package identifier and version number. Each data package request 408 made by a client device may also be stored in the memory 405. Such data package requests 408 may include a list of the various remaining portions of the data package that are not included among the content elements already stored on the client device.

The download server 400 may also include well-known support functions 409, such as input/output (I/O) elements 411, power supplies (P/S) 413, a clock (CLK) 415, and cache 417. The download server 400 may further include a storage device 419 that provides non-volatile storage for applications and data. The storage device 419 may be used for long-term storage of a database 420 configured to provide the download server 400 with a directory of all authorized content (e.g., original content, authorized updated content, etc.) circulating within the closed-universe network. The inventory 407 of the client's device and data package request 408 may be checked against the database 420 to determine which portions of the requested data package are already stored at the client device and which portions of the requested data package are to be transferred.

The download server 400 may optionally include a user interface 431 to communicate user inputs from one or more users to the download server 400. By way of example, the user interface 431 may be coupled to the download server 400 via the I/O elements 411. Examples of a user interface 331 may include a keyboard, mouse, joystick, light pen, or other device that may be used in conjunction with a graphic user interface (GUI).

The download server 400 may also include a network interface 425 to facilitate communication via an electronic communications network 429. The network interface 425 may be configured to implement wired or wireless communication over local area networks and wide area networks such as the Internet. The download server 400 may send and receive data and/or requests for files via one or more message packets 427 over the network 429.

The components of the download server 400, including the processor 401, memory 405, support functions 409, data storage 419, user interface 431, and network interface 425 may be operably connected to each other via one or more data buses 433. These components may be implemented in hardware, software or firmware or some combination of two or more of these.

Embodiments of the present invention facilitate efficient download of data packages by taking advantage of data redundancies within a closed universe network and existing content stored on the client device. By gathering portions of a requested data package from among existing stored restricted content elements, the actual size of the data package transmitted between a download server and client device may be greatly reduced. This in turn leads to shorter transfer times and more efficient bandwidth usage without placing any significant additional strain on the client device or download server.

It is noted that although certain examples are described in terms of implementations involving video game platforms, embodiments of the invention are not limited to such implementations. Alternatively, embodiments of the invention may also apply to other closed platform systems such as smart phones.

Although embodiments are described above that mostly relate to closed-platform systems, it is noted that embodiments of invention may be extended to open-platform systems as well. For example, as noted above, if the client device is part of an open-platform system, the embodiment described with respect to FIG. 2 may be extended with extra optional scanning and verification of files or data portions to ensure that the client device contains the either the data portions that the download server expects or suitable substitutes. There are a number different open-platform systems that may be modified to incorporate features of the present invention. For example, while Windows programs can use any number of installers, there are a subset (e.g. WISE installer) that are commonly known enough that they can be modified to incorporate features of the present invention. On Linux systems, the RPM or apt-get package managers that keep track of packaged and installed files could be leveraged to make use of such features as well. Furthermore, Macintosh systems use a system installer that could in many cases be modified to incorporate efficient download of data packages using features described herein. While the above is a complete description of the preferred embodiment of the present invention, it is possible to use various alternatives, modifications, and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for".

What is claimed is:

1. In a client device configured to operate on a network, a method for efficient download of a data package, comprising:

a) sending an inventory identifying existing content packages stored in the client device to a server operating on the network;
b) receiving a response from the server containing information identifying one or more portions of the data package corresponding to one or more existing content elements stored on the client device;
b') verifying that the identified portions correspond to existing content elements stored in the client device, wherein the client device is an open platform device;
c) gathering the one or more identified portions of content within the data package from existing content elements stored in the client device and identifying one or more substitutes for one or more non-matching identified portions that do not correspond to content elements stored in the device and gathering the substitutes from among portions stored in the client device; and
d) requesting a remaining portion of the data package from the server.

2. The method of claim 1, further comprising, before a), sending a request to download the data package from the client device to the server.

3. The method of claim 2, wherein the request is made in response to an input from a user of the client device.

4. The method of claim 2, wherein the request is made automatically by the client device at a predetermined time.

5. The method of claim 1, wherein the inventory of existing content includes a list identifying each content item stored in the client device and a corresponding version number for each content item.

6. The method of claim 1, wherein the response from the server includes information indicating a location within the client device for each of the one or more existing content elements stored on the client device.

7. The method of claim 1, wherein the response from the server includes a list of identifiers corresponding to one or more existing content elements stored on the client device.

8. The method of claim 1, wherein the response includes code and/or data configured to guide the client device in gathering the one or more portions identified in the response.

9. The method of claim 1, wherein c) includes copying the one or more existing content elements stored in the client device.

10. The method of claim 1, wherein c) includes generating a pointer for each identified portion of the data package, the pointer indicating the location of a corresponding existing content element stored in the client device.

11. The method of claim 1, wherein d) includes performing a scan of the gathered identified portions of the data package to determine the remaining portion of the data package.

12. The method of claim 1, further comprising f) examining the data package for any missing portions.

13. The method of claim 1, wherein d) includes requesting one or more non-matching identified portions that do not correspond to content elements stored in the device.

14. The method of claim 1, wherein the remaining portion of the data package is received from the server in response to the received request.

15. A client device configured to operate in a closed platform network, comprising:
   a processor;
   a memory coupled to the processor;
   one or more instructions embodied in memory for execution by the processor, the instructions being configured to implement a method for efficient download of a data package, the method comprising:
   a) sending an inventory identifying existing content stored in the client device to a server operating on the closed platform network;
   b) receiving information from the server identifying one or more portions of the data package that correspond to one or more existing content elements stored on the client device;
   b') verifying that the identified portions correspond to existing content elements stored in the client device, wherein the client device is an open platform device;
   c) gathering the one or more identified portions of the data package from existing content elements stored on the client device and identifying one or more substitutes for one or more non-matching identified portions that do not correspond to content elements stored in the device and gathering the substitutes from among portions stored in the client device; and
   d) requesting a remaining portion of the data package from the server; and
   e) receiving the remaining portion of the data package from the server.

16. In a server configured to operate on a network, a method for efficient download of a data package, comprising:
   a) receiving an inventory identifying existing content packages stored in the client device, wherein the client device is an open platform device;
   b) identifying from the inventory one or more portions of the data package corresponding to one or more existing content elements stored on the client device and sending verifying information to the client that the client can use to verify that the identified portions match corresponding existing content elements stored in the client device;
   c) sending information to the client device identifying each of the one or more portions of the data package that are stored as existing content elements on the client device and identifying one or more substitutes for one or more non-matching identified portions that do not correspond to content elements stored in the device and notifying the client device of the substitutes;
   d) receiving a request from the client device for a remaining portion of the data package.

17. The method of claim 16, wherein the inventory includes a list identifying each content package stored on the client device and a corresponding version number for each content package stored on the client device.

18. The method of claim 16, wherein b) includes comparing a set of content elements in the data package to a set of existing content elements determined from the inventory.

19. The method of claim 18, wherein b) includes identifying the one or more portions of the data package that are stored as existing content elements on the client device from a content package identifier and version number for one or more content packages on the list.

20. The method of claim 18, wherein the information sent to the client device in c) includes information indicating a location within the client device for each of the one or more portions of the data package that are stored as existing content elements on the client device.

21. The method of claim 16, wherein the information sent to the client device includes a list of identifiers corresponding to one or more existing content elements stored on the client device.

22. The method of claim 16, wherein the remaining portion of the data package is sent to the client device in response to the received request.

23. A server configured to operate on a network, comprising:

a processor;

a memory; and one or more instructions embodied in memory for execution by the processor, the instructions being configured to implement a method for efficient download of a data package, the method comprising:

a) receiving an inventory identifying existing content packages stored on the client device, wherein the client device is an open platform device;

b) identifying one or more portions of the data package corresponding to one or more existing content elements stored on the client device from the inventory and sending verifying information to the client that the client can use to verify that the identified portions match corresponding existing content elements stored in the client device;

c) sending information to the client device identifying the one or more existing content elements and identifying one or more substitutes for one or more non-matching identified portions that do not correspond to content elements stored in the device and notifying the client device of the substitutes;

d) receiving a request from the client device for a remaining portion of the data package;

e) sending the remaining portion of the data package to the client device.

* * * * *